United States Patent [19]

Phillips

[11] 3,735,324

[45] May 22, 1973

[54] DIGITAL FREQUENCY DISCRIMINATOR

[75] Inventor: T. H. Phillips, Minneapolis, Minn.

[73] Assignee: The United States of America as represented by the Secretary of the Navy, Washington, D.C.

[22] Filed: Dec. 2, 1971

[21] Appl. No.: 204,236

[52] U.S. Cl. .................................. 328/133, 307/218
[51] Int. Cl. .............................................. H03d 13/00
[58] Field of Search ............................ 328/133, 134; 307/218

[56] References Cited

UNITED STATES PATENTS

| | | | |
|---|---|---|---|
| 3,328,688 | 6/1967 | Brooks | 328/133 X |
| 3,200,340 | 8/1965 | Dunne | 328/134 X |
| 3,430,148 | 2/1969 | Miki | 328/133 |
| 3,509,476 | 4/1970 | Roth | 328/134 |
| 3,534,261 | 10/1970 | Haner et al. | 328/133 X |
| 3,600,690 | 8/1971 | White | 328/133 |
| 3,626,307 | 12/1971 | Koyama | 328/133 |

*Primary Examiner*—John S. Heyman
*Attorney*—R. S. Sciascia, J. A. Cooke & R. J. Erickson

[57] ABSTRACT

A digital frequency comparator for determining the difference in frequency between two time-dependent input waveforms and for further determining the sign relationship therebetween. Each of the input waveforms is applied to a bistable circuit arrangement which, through the use of logical coincidence gates, modulates the input data into a time-ordered format. A memory bistable circuit in conjunction with further logical coincidence circuit arrangements determines from the time reordered input waveform which one of said waveforms has the greater frequency along with the frequency difference therebetween.

6 Claims, 2 Drawing Figures

T. H. PHILLIPS
ATTORNEY

DIGITAL FREQUENCY DISCRIMINATOR

BACKGROUND OF THE INVENTION

This invention relates generally to a digital frequency comparator and more specifically to a digital frequency comparator which by the use of bistable circuitry and logical coincidence gating arrangements is able to determine the signal having the greater frequency of two incoming signals. The digital frequency comparator of the subject invention is capable of further determining the relative frequency difference between the two incoming signals.

Most prior art frequency comparators and discriminators are of the sum and difference, analog mixer variety. These circuits are capable of determining which one of two incoming signals has the greater frequency value but they cannot determine the quantitative relationship therebetween. If this latter feature is desired, most prior art devices resort to the phase comparative approach. However, as this method is inherently analog, problems arise in connection with signal-to-noise relationships. The subject invention, having a digital approach, eliminates the necessity for providing adequate signal-to-noise ratios.

SUMMARY OF THE INVENTION

The digital frequency comparator of the subject invention performs frequency evaluation by utilizing only flip-flop bistable circuits, inverter circuitry and AND coincidence gates. A clock signal is also required. Thus, it is obvious that the present invention obviates the need for complex and numerous circuit components. The digital frequency comparator of the present invention receives a first signal having a frequency referred to as $f_A$ and a second signal having a frequency referred to as $f_B$. Each of the incoming signals is applied to a pair of flip-flop circuits and subsequently to an AND gate. Since the clock signal is also applied to each of the flip-flops, the above arrangement provides for delaying and synchronizing the incoming signals to a clock pulse. The flip-flops cannot generate an output pulse unless, inter alia, the positive going portion of the clock signal is present. The output of the flip-flop pairs are applied to a 'memory' flip-flop circuit which determines when a frequency difference exists between the two incoming signals. More specifically, if the two incoming signals are at the same frequency, then the positive going portion of the first received signal will place the 'memory' flip-flop in the SET condition. The positive going portion of the second received waveform will cause the flip-flop to switch to the RESET condition. However, if $f_A > f_B$, there will occur a condition when two positive cycles of $f_A$ will occur inbetween two positive cycles of $f_B$. When this condition occurs the 'memory' flip-flop will emit a pulse into the $f_A$ output circuitry. This output pulse indicates the condition $f_A > f_B$ and the output pulse repetition rate indicates the relative magnitude of how much $f_A$ exceeds $f_B$.

It is an object of this invention to provide a digital frequency comparator that can determine which one of two input signals has the greater frequency and the digital magnitude of the difference.

Another object of the invention is to provide a digital frequency comparator that requires only bistable circuitry, inverters, coincidence gating circuits and a clocking signal to digitally perform frequency comparison.

And another object of the present invention is to provide frequency comparison by a completely digital network.

The foregoing and other objects of this invention, the features thereof and the invention itself will be more fully understood from the following description when read in connection with the accompanying drawing.

DESCRIPTION OF THE PREFERRED EMBODIMENTS

Figure 1:
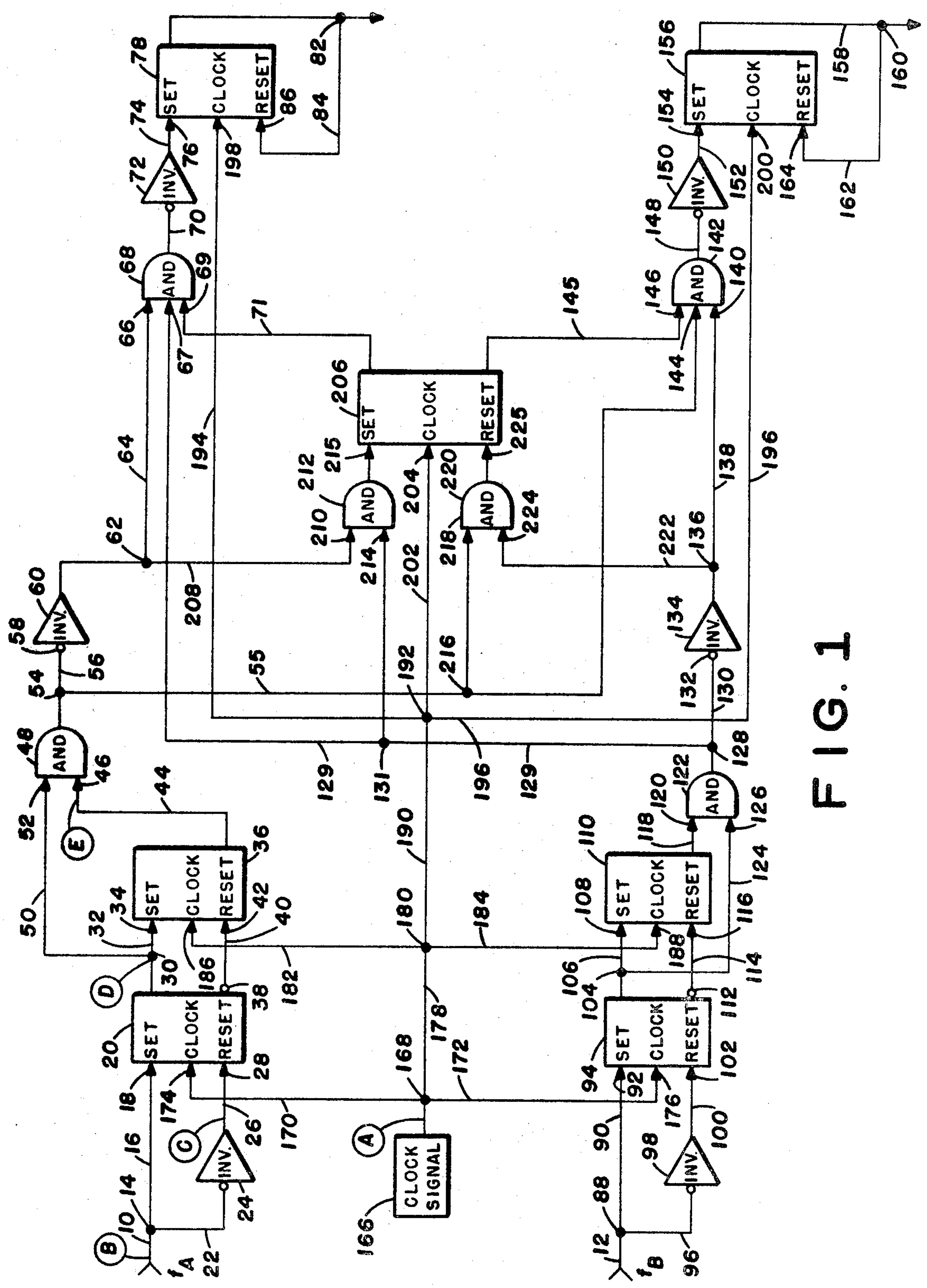
FIG. 1 illustrates by means of a block diagram the preferred embodiment of the present invention.

Referring first to FIG. 1, the digital frequency discriminator of the subject invention receives incoming signals on input lines 10 and 12. The incoming signal on input line 10 has a frequency which will be referred to as $f_A$. Similarly, the incoming signal on input line 12 has a frequency to be referred to as $f_B$. The input line 10 is connected to a junction 14 which is connected by a conductor 16 to a SET input terminal 18 of a bistable flip-flop circuit 20. The incoming signal at junction 14 is also applied by a conductor 22 to an inverter 24. The output signal from inverter 24 is connected by a conductor 26 to a RESET input terminal 28 of flip-flop 20. The SET output signal of the flip-flop 20 is applied to a SET output terminal 30 and is connected by a conductor 32 to a SET input terminal 34 of a second bistable flip-flop circuit 36. The RESET output signal of the flip-flop 20 is applied to a RESET output terminal 38 and is connected by a conductor 40 to a RESET input terminal 42 of flip-flop 36. The RESET output signal of flip-flop 36 is connected by a conductor 44 to a first input terminal 46 of a coincidence gate 48. The signal at terminal 30 is applied by a conductor 50 a second input terminal 52 of coincidence gate 48. The output signal of the coincidence gate 48 is applied to a junction 54 which is connected by way of a conductor 56 to an input terminal 58 of an inverter 60. The output signal of the inverter 60 is applied to a junction 62. From junction 62 a connection is made by a conductor 64 to a first input terminal 66 of a second coincidence gate 68. Second and third inputs to the coincidence gate 68 are present and will be explained more fully hereinafter. The output signal from coincidence circuit 68 is connected by a conductor 70 to an inverter 72. The output signal from inverter 72 is connected via conductor 74 to a SET input terminal 76 of a third bistable flip-flop circuit 78. The SET output signal 80 is applied to an output terminal junction 82. From the output terminal junction 82, the output signal is fed, by a conductor 84, to a RESET input terminal 86.

As previously mentioned, the incoming signal on input line 12 has a frequency which will be referred to as $f_B$. The input line 12 is connected to a junction 88 which is connected by a conductor 90 to a SET input terminal 92 of a fourth bistable flip-flop circuit 94. The incoming signal at junction 88 is also applied through a conductor 96 to an inverter 98. The output signal from inverter 98 is connected by a conductor 100 to a RESET input terminal 102 of a flip-flop 94. The SET output signal of the flip-flop 94 is applied to a SET output terminal 104 and is connected by a conductor 106 to a SET input terminal 108 of a fifth bistable flip-flop circuit 110. The RESET output signal of the flip-flop 94 is applied to a RESET output terminal 112. From terminal 112 the RESET output signal of flip-flop 94 is connected through a conductor 114 to a RESET input terminal 116 of a flip-flop 110. The RESET output signal of the flip-flop 110 is connected by a conductor 118 to a first input terminal 120 of a third coincidence gate 122. The signal appearing at SET output terminal 104 is applied by a conductor 124 to a second input terminal 126 of coincidence gate 122. The output signal of the coincidence gate 122 is applied to a junction 128 which is connected by a conductor 130 to an input terminal 132 of an inverter 134. The output signal of the inverter 134 is applied to a junction 136. From junction 136 a connection is made by way of a conductor 138 to a first input terminal 140 of a fourth coincidence gate 142.

As stated hereinabove, there exist second and third inputs to second coincidence gate 68. From junction 128 a connection is made by way of a conductor 129 to a second input terminal 67 of second coincidence gate 68. Similarly, there also exist second and third inputs to previously mentioned fourth coincidence gate 142. From junction 54 a connection is made by a conductor 55 to a second input terminal 144 of a fourth coincidence gate 142.

The output signal from coincidence circuit 142 is connected by a conductor 148 to an inverting circuit 150. The output signal from inverting circuit 150 is connected via conductor 152 to a SET input terminal 154 of a sixth bistable flip-flop circuit 156. The SET output signal 158 is applied to an output terminal junction 160. From the output terminal junction 160, the output signal is fed by way of a conductor 162 to a RESET input terminal 164.

The digital frequency discriminator of the subject invention also comprises a clock signal generator 166 whose output signal is applied to a junction 168. From junction 168 a connection is made via conductors 170 and 172 to clock input terminals 174 and 176 respectively of flip-flops 20 and 94 respectively. A connection is made from junction 168 by a conductor 178 to a junction 180 and from junction 180 a connection is made via conductors 182 and 184 to clock input terminals 186 and 188, respectively, of flip-flops 36 and 110. A connection is made from junction 180 by a conductor 190 to a junction 192. From junction 192 a connection is made via conductors 194 and 196 to clock input terminals 198 and 200 of flip-flops 78 and 156, respectively. A connection is made from junction 192 by a conductor 202 to a clock input terminal 204 of a seventh bistable flip-flop circuit 206. The SET and RESET input connections to flip-flop 206 are as follows: from junction 62 a connection is made by a conductor 208 to a first input terminal 210 of a coincidence gate 212. From junction 128 a connection is made to a junction 131 by a conductor 129. A connection is made from junction 131 to a second input terminal 214 of coincidence gate 212. The output from the coincidence gate 212 is connected to a SET input terminal 215 of flip-flop 206. The SET output signal of flip-flop 206 is connected via conductor 71 to a third input terminal 69 of coincidence gate 68. From junction 54 a connection is made via conductor 55 to a junction 216, from which a connection is made to a first input terminal 218 of a coincidence gate 220. From junction 136 a connection is made via a conductor 222 to a second input terminal 224 of coincidence gate 220. The output of the coincidence gate 220 is connected to a RESET input terminal 224 of flip-flop 206. The RESET output signal of the flip-flop 206 is connected via conductor 145 to a third input terminal 146 of the coincidence gate 142.

Now that the physical arrangement of the preferred embodiments has been described in detail, consideration will be given to the operation of the circuit.

OPERATION

Figure 2:
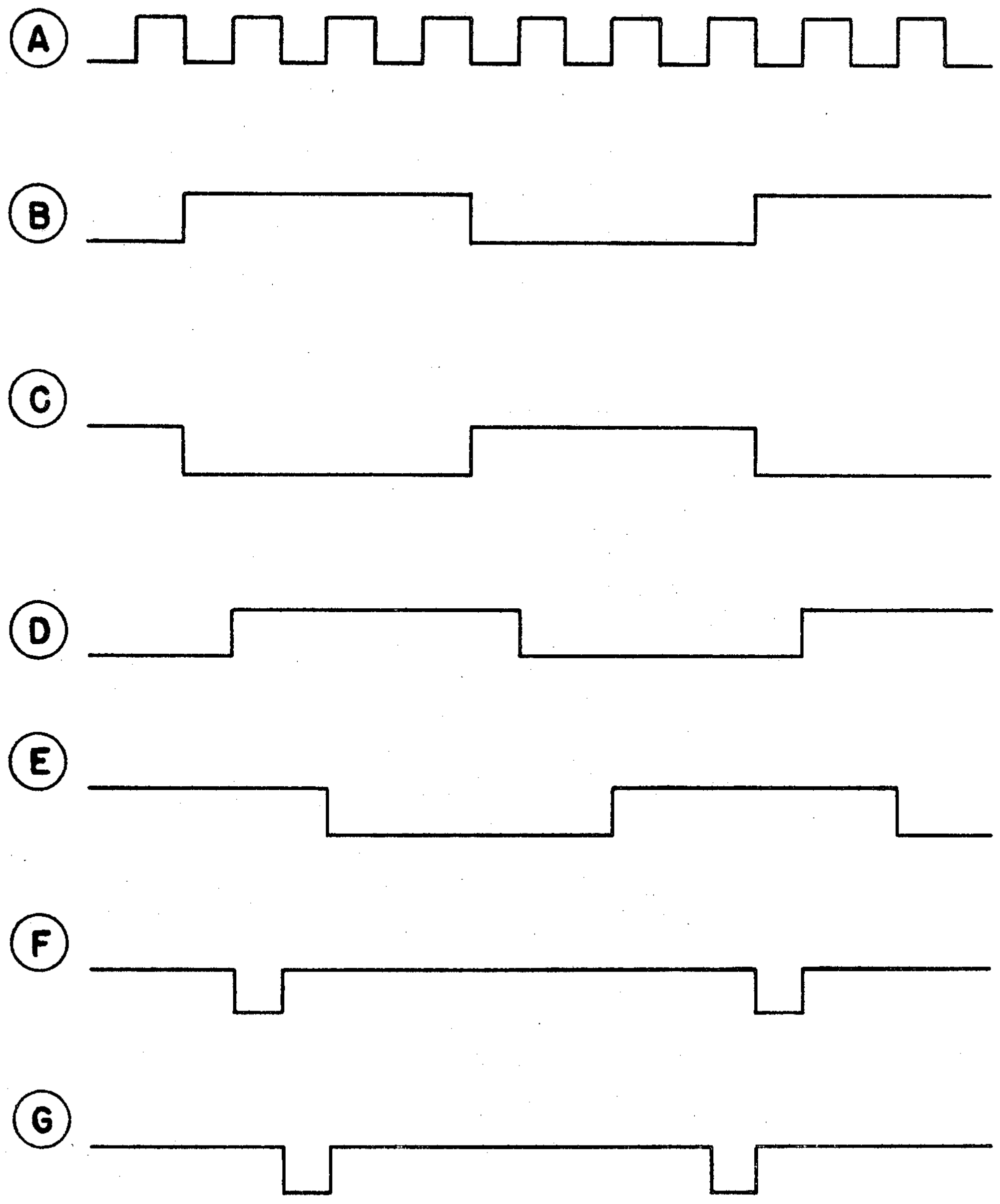
FIG. 2 illustrates the waveforms obtained at various identified points in the circuit of FIG. 1.

The operation of the preferred embodiment illustrated in FIG. 1 can best be explained by referring to the waveforms shown in FIG. 2. Where appropriate, the letters appearing at the left of FIG. 2 to identify the various presented waveforms are also illustrated in the circuit of FIG. 1 by circling the letter and providing a lead line to the point in the circuit where the discussed waveform appears.

Waveform A illustrates the clock signal as produced by clock signal generator 166. The clock signal, as previously described, is applied to the clock input terminals of each flip-flop circuit of the subject invention. As will be discussed in detail hereinafter, in order for each flip-flop to produce output signals it is necessary that when input signals appear at the SET and RESET input terminals, a clock signal must also appear at the clock input terminals.

Waveform B illustrates the signal previously referred to as $f_A$ which appears on input line 10. Waveform B is applied to the input terminal 18 of flip-flop 20. The complement of waveform B is obtained by taking said waveform from junction 14 by conductor 22 and applying it to the inverter 24. The result, illustrated by waveform C, is applied to RESET input terminal 28 of flip-flop circuit 20. It should be noted that the frequency of waveform B is not known. As can be seen the leading edge of waveform B, as illustrated, occurs on the trailing edge of one pulse of waveform A. However, when waveform A is received by flip-flop 20, a time delay is performed as is illustrated by waveform D which appears at junction 30. The complement of waveform D, which is not illustrated, appears at terminal 38. It should be noted that waveform D has the same time period as waveform B but the leading edge of waveform D now coincides with the leading edge of one of the pulses of waveform A. Waveform D, from junction 30, is then applied to one input terminal of coincidence gate 48.

All the coincidence gates previously mentioned are preferably logical AND gate circuits, many forms of which are well known in the art. In order for an AND gate to produce an output signal, it is necessary that the signals applied to the inputs thereof be in the commonly referred to "high" state. Therefore, when all the inputs are high, the AND gate will produce a "low" output. Hereinafter, the common term AND gate will be used in lieu of the previously used term coincidence gate. The output of the flip-flop 36 is illustrated by waveform E. As can be seen, the primary function of flip-flop 36 is to serve as a delay device by delaying in time the leading edge of waveform D. It also serves to invert the amplitude of waveform D, thereby providing a high input during the leading edge of the waveform E. When both inputs are present at the AND gate 48 an output pulse is presented to junction 54. It would be obvious to one skilled in the art that flip-flops 20 and 36 form a detection pair, and provide a pulse equal to the clock period at junction 54 each time the input frequency changes from a zero level to a positive level. Herein lies the basic theory of operation of the invention. If both $f_A$ and $f_B$ are viewed simultaneously, with $f_A$ made stationary in time, the $f_B$ waveform would appear to slip in phase with respect to $f_A$. This slip in phase would periodically cause two successive positive-going zero crossings on the higher frequency waveform to occur between two successive positive zero-going crossings of the lower frequency waveform. The number of times per second this event occurs is directly proportional to the difference between the two input frequencies. This theory is presented by waveforms F and G. Assuming that waveform G is the higher frequency, it can be seen that two successive pulses will occur intermediate the occurrence of two successive pulses of waveform F, the lower frequency waveform.

The detection of $f_B$ occurs on the same theory as the previously described detection of $f_A$. The waveforms of $f_B$ are applied to the SET and RESET input terminals of flip-flop 94 and are further applied to the SET and RESET terminals of flip-flop 110. The SET output of flip-flop 94 is applied to one terminal of AND gate 122. The RESET output of flip-flop 110 is applied to input terminal 120 of AND gate 122. The output signal of AND gate 122 is applied to junction 128. The output signal from flip-flop 48 is applied to the RESET terminal of flip-flop 206. In a like manner the output signal of AND gate 122 is applied to the SET terminal of flip-flop 206. The basic function of flip-flop 206 is to remember which pulse was received last. If $f_A$ and $f_B$ are at the same frequency, the $f_A$ pulse, assuming it occurs first in time, is used to SET the flip-flop 206. Next, occurring in time would be an $f_B$ pulse which would be used to RESET the flip-flop 206. Accordingly, no output pulses would be produced by the flip-flop 206. However, if two successive pulses are received on $f_A$, thereby indicating $f_A$ to be greater than $f_B$, the first pulse would be used to SET flip-flop 206. However, before the pulse on $f_B$ would be present to RESET flip-flop 206, the second pulse would be passed through flip-flop 206 to AND gate 68 and a pulse would appear at the output junction 82. Conversely, two successive pulses received on $f_B$ will, in the same manner as described above, cause one pulse to appear at output terminal 160. As described previously, for alternating pulses between $f_A$ and $f_B$, flip-flop 206 changes state for each pulse and prevents any pulses from appearing at output terminals 82 or 160. It is only when $f_A$ is greater than $f_B$ or vice versa that an output pulse will appear at either output terminal 82 or 160. As previously mentioned, the pulse current rate at the output terminals is directly proportional to the difference in frequency between $f_A$ and $f_B$. In this manner, the present invention determines which of two incoming frequencies is larger and the frequency difference therebetween.

It is anticipated that the present invention can be utilized in other embodiments than that which has been described in this application. For example, the output of the subject invention can be modified to produce longer output pulses, and the level shifted to change the output scaling, or applied to a differential amplifier and filter arrangement to obtain an analog representation of the difference frequency. The invention is ideal as an input to an up-down counter since it is not subject to the terminate state found in most up-down counters caused by synchronous pulses at the input. It is therefore to be understood that, within the scope of the appended claims, the invention may be practiced otherwise than as specifically described hereinabove.

I claim:

1. A digital frequency comparator for determining which of first and second input signals of unknown frequency has the higher frequency and the quantitative relationship therebetween, said digital frequency comparator comprising:

means for generating a timing signal having a periodically varying, time dependent waveform, means connected to receive said timing signal and said first and second input signals for synchronizing a predetermined portion of each of said first and second input signals with a predetermined portion of said timing signal to produce time synchronized first and second signals, means connected to said synchronizing means for inverting each of said time synchronized first and second signals, first logical coincidence gating circuit means connected to said synchronizing means and to said inverting means for producing first and second coincidence signals indicating respectively the existence of time coincidence between said first time synchronized signal and said inverted second time synchronized signal and between said second time synchronized signal and said inverted first time synchronized signal, bistable circuit means comprising a set input connected to receive said second coincidence signal and a reset input connected to receive said first coincidence signal, for producing a set output signal when said second coincidence signal is present and a reset output signal when said first coincidence signal is present, second logical coincidence gating circuit means connected to said bistable circuit means, said second time synchronized signal and said inverted first time synchronized signal for producing a coincidence signal indicating the existence of time coincidence among said set output signal, said second time synchronized signal and said inverted first time synchronized signal, third logical coincidence gating circuit means connected to said bistable circuit means, said first time synchronized signal and said inverted second time synchronized signal for producing a coincidence signal indicating the existence of time coincidence among said reset output signal, said first time synchronized signal and said inverted second time synchronized signal, said second logical coincidence gating circuit means or said third logical coincidence gating circuit means being rendered effective selectively to generate an associated output pulse whenever at least two successive predetermined portions of said second and first time synchronized signals respectively are received by said second and third logical coincidence gate circuits respectively, whereby the occurrence of an output pulse generated by said second or third logical coincidence gating circuit means indicates respectively that said second or first input signal is of higher frequency, and the rate at which said associated output pulses are produced by said second or third logical coincidence gate circuit means indicating the quantitative frequency difference between said first and second input signals.

2. The digital frequency comparator as recited in claim 1 wherein said synchronizing means comprises:

a first bistable circuit comprising a set input for receiving said first signal, a reset input for receiving the complement of said first signal and a clock input for receiving said timing signal, said bistable circuit producing an output signal in time synchronization with said timing signal, and a second bistable circuit comprising a set input for receiving said second signal, a reset input for receiving the complement of said second signal and a clock input for receiving said timing signal, said second bistable circuit producing an output signal in time synchronization with said timing signal.

3. The digital frequency comparator as recited in claim 2, wherein said bistable circuit means, said first bistable circuit and said second bistable circuit are flip-flops.

4. The digital frequency comparator as recited in claim 3, and further comprising means for effecting a time-delay on said first and second synchronized signals.

5. The digital frequency comparator as recited in claim 4, wherein said bistable circuit means is provided with a clock input for receiving said timing signal.

6. The digital frequency comparator as recited in claim 5, wherein said logical coincidence gating circuit means comprise AND gates.

* * * * *